UNITED STATES PATENT OFFICE.

ROBERT J. KING, OF STAMFORD, CONNECTICUT.

PROCESS FOR PRODUCING CHLOROPICRIN.

1,327,714.      Specification of Letters Patent.     Patented Jan. 13, 1920.

No Drawing.     Application filed November 26, 1917. Serial No. 204,045.

*To all whom it may concern:*

Be it known that I, ROBERT J. KING, a citizen of the United States of America, residing at Stamford, in the county of Fairfield and State of Connecticut, have invented certain new and useful Improvements in Processes for Producing Chloropicrin, of which the following is a specification.

My invention relates to a process for producing chloropicrin wherein bleaching powder or its equivalent is utilized and has as its object perfecting the control of the reaction, increasing the yield and avoiding or eliminating the production of oxidation products.

In the production of chloropicrin it has hitherto been customary to effect the chlorination of picric acid by treating it with bleaching powder in the presence of water. The proportions used in ordinary practice are as follows:

| | |
|---|---|
| Bleaching powder | 10 parts |
| Water | 50 parts |
| Picric acid | 1 part |

In carrying out this reaction with solid picric acid it has been found practically impossible to properly control the reaction. The reaction under these conditions is itself violent; the production of carbon dioxid, and hydrochloric acid and its absorption in the calcium hydrate simultaneously produced causes extraordinary evolution of steam and foaming; the heating is excessive; and the yield of chloropicrin varies from zero to almost the theoretical amount without apparent reason in the conduct of the reaction. Oxidation also occurs and acts to reduce the yield, causing the production of resinous substances.

Attempts have also been made to produce chloropicrin by direct treatment of picric acid or of sodium or calcium picrate with chlorin. This process has also given poor results, the yield of chloropicrin being very low, the accompanying oxidation reactions producing relatively large quantities of brownish or reddish resinous substances.

I have discovered that the chlorination process in which bleaching powder is used may be better controlled and the yield improved by having the reacting materials completely in solution before mixing and also that greater dilutions mean less trouble from excessive heating. I prepare a solution of picric acid or preferably a solution of calcium picrate. Calcium picrate is very soluble, easy and cheap to prepare and works well. I either prepare a filtered bleaching powder solution or prepare as nearly as possible a homogeneous cream of bleaching powder. I have further found that by maintaining the conditions of reaction such that there is constantly present an excess of active chlorin as calcium hypochlorite the reaction may be perfectly controlled, and the yield maintained always at substantially the theoretical.

Thus, in the production of chloropicrin, I may use the following reagents in the proportions indicated:

| | |
|---|---|
| Calcium picrate | 10.8 parts |
| Bleaching powder (35% available) | 88 parts |
| Water | 200 to 800 parts |

I first dissolve the calcium picrate in about 30 parts of water. The bleaching powder is then thoroughly mixed with the remainder of the water and the solution of calcium picrate is gradually added with mixing. A vigorous reaction takes place and the yellow color of the mixture rapidly disappears. The chloropicrin is separated by distillation with steam.

I have found that I may also carry out my invention by utilizing the initial ingredients of bleaching powder, namely, lime and chlorin and calcium picrate under conditions such that chlorination of the lime and reaction with the calcium picrate proceed intermittently or practically simultaneously. This reaction also I effect under conditions such that there is constantly present an excess of calcium hydrate and of chlorin as hypochlorite, the formation of chloropicrin being then practically instantaneous and unaccompanied by the formation of oxidation products or other products tending to reduce the yield.

As an example of this method of carrying out my invention, I may proceed as follows: 32 parts of lime are first slaked and thoroughly mixed with approximately six times its weight of water. A solution is formed of 10.8 parts of calcium picrate in about 30 parts of water. Chlorin is then passed into the mixture of slaked lime and water and the solution of calcium picrate is slowly added at a rate such that the lime and chlorin are constantly in excess. The mass is constantly stirred during reaction. The yellow color of the picrate offers an index of an excess thereof which is to be avoided. After completion of the reaction the chloropicrin is distilled off.

The latter example may be carried out by absorbing chlorin directly in the suspension of slaked lime until the latter is converted into the mixture of calcium hypochlorite and calcium chlorid solution, known as "liquid bleach." The calcium picrate is then added to the liquid bleach with stirring and the chloropicrin distilled off.

Having thus described my invention, I claim:

1. In a process for producing chloropicrin, forming an admixture of bleaching powder with water and adding a solution of calcium picrate thereto.

2. In a process for producing chloropicrin, forming an admixture of bleaching powder with water and adding a solution of calcium picrate thereto while maintaining the chlorin and the alkali of said bleaching powder in excess.

3. The process of producing chloropicrin which consists in forming an admixture of bleaching powder with water wherein the amount of water is six times the equivalent of CaO, and adding a solution of a calcium picrate thereto.

In testimony whereof I affix my signature in the presence of two witnesses.

ROBERT J. KING.

Witnesses:
 CLARENCE CHURCHILL,
 CARL H. HAZARD.